United States Patent Office 2,924,609
Patented Feb. 9, 1960

2,924,609

(1 - ALKYLAMINO - 2 - ANTHRAQUINONYLCARBONYLAMIDO)ALKYL TRIALKYL AMMONIUM SALTS AS DISPERSE DYES FOR ACRYLIC FIBERS

Asa Willard Joyce, Plainfield, N.J.

No Drawing. Original application September 25, 1957, Serial No. 686,016. Divided and this application June 10, 1958, Serial No. 741,006

4 Claims. (Cl. 260—377)

This invention relates to new cationic anthraquinone disperse dyes for coloring acrylic fibers. More particularly, it relates to 1-substituted amino anthraquinone-2-carboxamides having no other ring substituents, in which the substituting group in the said 1-substituted amino, when not lower alkyl, is cyclohexyl, and in which the said carboxamide group is a substituted carboxamide, the said substituting group being a quaternary ammonium alkylene group, the quaternary ammonium nitrogen of which is substituted by three groups, at least two of which are lower alkyl, the other being, when not lower alkyl, a substituted alkyl which, when not aralkyl, is hydroxy lower alkyl.

This application is a division of my copending application Serial No. 686,016, filed September 25, 1957, now abandoned.

The polyacrylonitrile fibers, which have become increasingly useful articles of commerce, are difficult to dye. Most of the commercially available fibers of this type contain a major proportion of polyacrylonitrile. In most cases over 85% of the fibers is acrylonitrile. Few of the standard dyestuffs available show affinity for these high acrylonitrile content fibers. Especially it has been hard to obtain deep shades on these fibers, since deep shades require a strong affinity of the fiber for the dyestuff. The only way to achieve deep shades has been to increase the time and temperature of the dyeing process. Such drastic conditions of dyeing result in injury to the fabrics. The resistant properties of these fibers are desirable for general textile use because they render the fiber physically durable. However, the problem of dyeing has been so great that these durable types which are less durable physically unless methods of dyeing them readily are found. The usual disperse dyes have little or no affinity for polyacrylonitrile fibers. Those basic dyes which do dye fibers of this type give dyeings of poor fastness to light, also, such dyes need dispersing agents as solubilizing agents to disperse them properly in the dye bath.

I have found that certain cationic anthraquinone dyes of the formula:

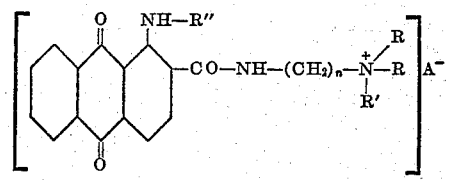

in which R is the lower alkyl group; R' is lower alkyl, aralkyl or hydroxy lower alkyl and R'' is lower alkyl or cyclohexyl, n being an integer from 2 to 4 and A⁻ being an anion, are highly soluble dyes with excellent affinity for polyacrylonitrile fibers of high acrylonitrile content.

The new cationic anthraquinone dyes of my invention may be readily prepared from 1-nitroanthraquinone-2-carbonyl chloride by reaction with various alkylene diamines followed by replacement of the readily removable nitro group by reaction with an alkylamine and finally quaternization of the resultant product to form the dyestuff. The preparation can be shown by the following equation:

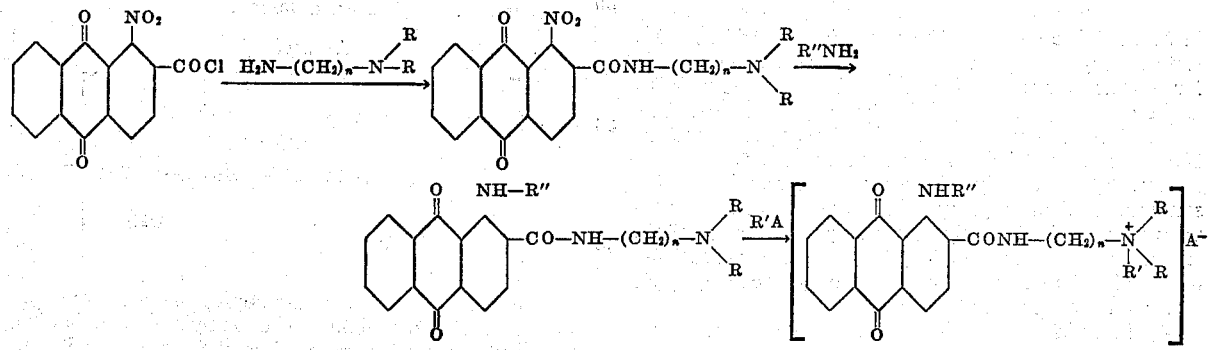
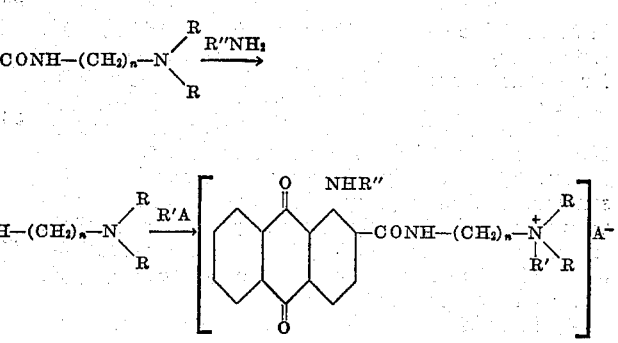

Suitable diamines which may be reacted with the acid chloride are compounds such as dimethylaminoethylamine, diethylaminoethylamine, dimethylaminopropylamine, diethylaminopropylamine, dimethylaminobutylamine, diethylaminobutylamine, and the like. Higher alkyl groups can be placed on the amino group, such as propyl, butyl, and hexyl. Similarly, the alkyl groups need not be the same, so that one can use methylethylaminoethylamine or methylethylaminopropylamine and the like.

For the replacement of the nitro group any primary alkylamine up to 6 carbon atoms can be used such as methylamine, ethylamine, propylamine, isopropylamine, butylamine, isobutylamine, and the like and cyclohexylamine.

In the quaternization of the side chain amino group one can use any quaternizing agent R'A in which R' is the quaternizing group and A is the anion which may contain an organic residue. Examples of quaternizing agents which may be used include dialkyl sulfates, such as dimethyl sulfate, diethyl sulfate, dipropyl sulfate or dibutyl sulfate, alkyl halides such as methyl iodide, ethyl iodide, methyl chloride or ethyl chloride, propyl bromide, butyl bromide, hexyl bromide and the like, aralkyl halides such as benzyl chloride, phenylethyl bromide, and the like; alkyl esters of aryl sulfonic acids such as the methyl, ethyl, propyl or butyl esters of toluene sulfonic acids or substituted alkyl halides such as ethylene chlorohydrin, propylene chlorohydrin, and the like.

The polyacrylonitriles which may be dyed by the compounds of my invention and which when dyed fall within the scope of my invention are those polymers and copolymers of acrylonitrile which contain a major proportion by weight of acrylonitrile. They may also contain basic comonomers such as methyl vinyl pyridine and vinyl pyridine or comonomers such as methyl acrylate, vinyl acetate and vinyl chloride. Of the polyacrylonitriles available commercially which can be used to form the polyacrylonitriles of my invention, one is 100% polyacrylonitrile, another is approximately 95% acrylonitrile and approximately 5% methyl acrylate, another has 89% of acrylonitrile, 6% methyl vinyl pyridine and 5% vinyl acetate and still another has a composition of 94% acrylonitrile, 5% methyl vinyl pyridine and 1% vinyl acetate. Polymers having as little as 50% acrylonitrile can be dyed by this class of dyes of my invention to form the colored polymers of my invention.

It is an advantage of my invention that the dyes may be dyed at the boil by the usual dispersed dyeing methods. It is a further advantage of my invention that they are attractive bluish-red shades of good fastness to light. For example, a dyestuff of the formula:

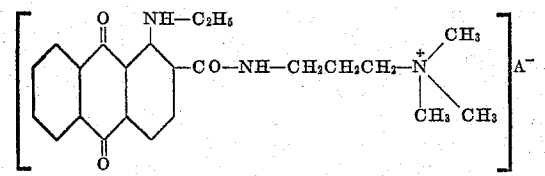

in which A is an anion such as bromide, chloride, methyl sulfate, ethyl sulfate, and the like, has excellent affinity for polyacrylonitrile fibers whether 100% polyacrylonitrile or copolymers containing basic comonomers. The above dyestuff gives an attractive bluish-red shade on 100% polyacrylonitrile throughout the entire range of the dye bath of weakly acid to neutral to weakly alkaline solution. It dyes polyacrylonitrile having basic comonomers in neutral to weakly alkaline dye baths at the boil. It is a further advantage of my invention that the cationic dyes claimed in this application also dye acetate, nylon and silk, as well as Vicara and wool.

My invention can be illustrated by the following examples in which parts are by weight unless otherwise specified. The examples are intended to illustrate the invention and not to limit it.

*Example 1*

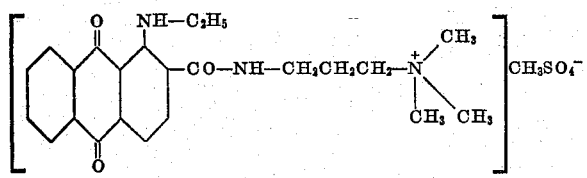

To 75 parts by volume of benzene at 25° C. is added 9.5 parts of 1-nitroanthraquinone-2-carbonyl chloride. Then, gradually 6.3 parts of dimethylaminopropylamine is added at 15–20° C. The mixture is stirred at 15–20° C. until the reaction is complete (which takes about an hour and fifteen minutes when parts are grams). The product is isolated by filtration, wished with benzene and dried. It is then slurried in 75 parts of water and sodium carbonate is added until the mixture is alkaline to phenolphthalein indicator paper. After further stirring, the product is again filtered, washed alkaline-free with water and dried.

To 60 parts by volume of toluene is added 5.7 parts of the above product and 2.7 parts by volume of 70% ethylamine. The mixture is stirred several hours at 85–90° C. and then at reflux (90–95° C.) until the reaction is complete. The resultant product 1-ethylamino-2-(N-dimethylaminopropylcarbamoyl)-anthraquinone is then isolated by evaporation of the mixture to dryness.

To 100 parts by volume of benzene is added 5.5 parts of the above ethylamino anthraquinone derivative and 1.5 parts by volume of dimethyl sulfate. The mixture is warmed on a steam bath until quaternization is complete. It is then allowed to cool and the quaternized product is filtered, washed with benzene and dried at about 50° C.

*Example 2*

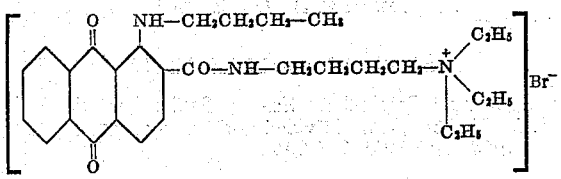

If in Example 1, the dimethylaminopropylamine is replaced with an equivalent amount of diethylaminobutylamine and the resultant nitro dye reacted with an equivalent amount of butylamine instead of ethylamine and the resultant dye quaternized with an excess of ethyl bromide instead of dimethyl sulfate, a cationic anthraquinone dye of the above formula is obtained. It dyes acrylic fibers bluish-red shades Similarly, if the quaternization step is carried out using benzyl chloride or ethylene chlorhydrin in equivalent quantities instead of the ethyl bromide above, the corresponding diethyl benzyl ammonium and diethyl hydroxyethyl ammonium dyes are obtained.

*Example 3*

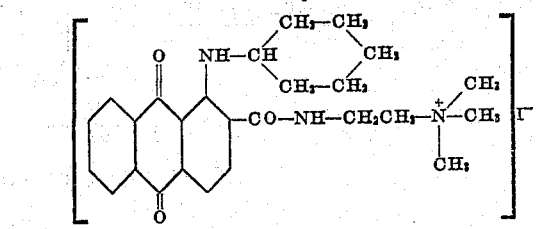

If in Example 1, dimethylaminopropylamine is replaced with an equivalent amount of dimethylaminoethylamine, the resultant nitro compound is then reacted with an equivalent amount of cyclohexylamine instead of ethylamine, and the resultant dye is quaternized with an excess of methyl iodide, a cationic anthraquinone dye of the above formula is obtained which dyes acrylic fibers bluish-red shades.

I claim:

1. Cationic anthraquinone dyes of the formula

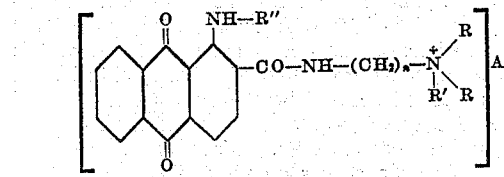

in which R is a lower alkyl group, R' is selected from the group consisting of lower alkyl, benzyl and hydroxy lower alkyl, R" is selected from the group consisting of lower alkyl and cyclohexyl, n is an integer from 2 to 4 and A is an anion.

2. [3 - (1-ethylamino-2-anthraquinonylcarbonylamino)-propyl]-trimethylammonium methyl sulfate.

3. [ 3 -(1-butylamino-2-anthraquinonylcarbonylamino)-propyl]-triethylammonium bromide.

4. [3 - (1-cyclohexylamino-2-anthraquinonylaminocarbonylamino)ethyl]trimethylammonium iodide.

No references cited.